US012741221B2

(12) United States Patent
Tai

(10) Patent No.: US 12,741,221 B2
(45) Date of Patent: Sep. 22, 2026

(54) GAME CONSOLE

(71) Applicant: CHENG UEI PRECISION INDUSTRY CO., LTD., New Taipei City (TW)

(72) Inventor: Wen-Hsiang Tai, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 224 days.

(21) Appl. No.: 18/651,670

(22) Filed: Apr. 30, 2024

(65) Prior Publication Data

US 2025/0083058 A1 Mar. 13, 2025

(30) Foreign Application Priority Data

Sep. 12, 2023 (CN) ......................... 202322464730.4

(51) Int. Cl.
*A63F 13/92* (2014.01)

(52) U.S. Cl.
CPC .................................... *A63F 13/92* (2014.09)

(58) Field of Classification Search
CPC ........... A63F 13/24; A63F 13/92; A63F 13/98
See application file for complete search history.

(56) References Cited

U.S. PATENT DOCUMENTS 5,046,739 A * 9/1991 Reichow ................ A63F 13/02
273/148 B
5,645,277 A * 7/1997 Cheng .................. A63F 13/323
463/37
9,895,606 B1 * 2/2018 Kamata ................. A63F 13/235
12,179,092 B2 * 12/2024 Lu .......................... A63F 13/92
2007/0045392 A1 * 3/2007 Youens ................. G06F 3/0216
235/145 R
2009/0312098 A1 * 12/2009 Chang ..................... A63F 13/22
463/31
2015/0018101 A1 * 1/2015 Schoenith .............. A63F 13/98
463/37
2018/0250588 A1 * 9/2018 Winick ................... A63F 13/24
2019/0030423 A1 * 1/2019 Onozawa ................ A63F 13/98
2021/0197075 A1 * 7/2021 Seibert .................. G06F 3/0338
2021/0299553 A1 * 9/2021 Lu ......................... G06F 1/1632
2023/0182006 A1 * 6/2023 Hu .......................... A63F 13/24
463/46

FOREIGN PATENT DOCUMENTS

EP 0745928 A2 * 12/1996 ............ A63F 13/24

* cited by examiner

*Primary Examiner* — Steven J Hylinski
(74) *Attorney, Agent, or Firm* — Cheng-Ju Chiang

(57) ABSTRACT

A game console includes a main body, two sliding blocks, two handle parts, two sliding rails, two limiting modules and two push buttons. Two outer surfaces of the main body are recessed inward to form two fixing grooves. The two sliding blocks are fixed in the two fixing grooves. Each sliding block has a base portion. The base portion is recessed inward to form an accommodating groove. The accommodating groove extends rearward to form a limiting hole. The two handle parts are detachably mounted to two opposite sides of the main body. The two sliding rails are disposed to two side surfaces of the two handle parts. The two limiting modules are mounted to the two sliding blocks. Each limiting module includes a limiting structure and an elastic element. The limiting structure has a buckling block. The buckling block is limited in the limiting hole.

17 Claims, 14 Drawing Sheets

GAME CONSOLE

CROSS REFERENCE TO RELATED APPLICATIONS

The present application is based on, and claims priority from, China Patent Application No. 202322464730.4, filed Sep. 12, 2023, the disclosure of which is hereby incorporated by reference herein in its entirety.

BACKGROUND OF THE INVENTION

Field of the Invention

The present invention generally relates to a game console, and more particularly to a game console which includes a detachable handle part and enhances an assembling stability.

Description of Related Art

Generally, a game console includes a main body and a handle part. The handle part is usually fastened to the main body of the game console on the market, so the main body and the handle part of the game console is a single piece structure, and the game console is portable. However, when one of the main body and the handle part is broken down, the game console entirely needs being repaired or replaced by a new one, so that a repairing cost or a replacement cost of the game console is increased.

A conventional game console includes the main body and a detachable handle part. The conventional game console includes a rail assembly. The rail assembly of the conventional game console includes a female structure, a male structure and a docking structure. The female structure is the main body, and the male structure is the detachable handle part. The female structure has a female end of the rail assembly, and the male structure has a male end of the rail assembly that is inserted into or withdrawn from the female end of the rail assembly along an extension direction of the female end of the rail assembly. The docking structure includes a first docking portion disposed in the female structure, and a second docking portion disposed in the male structure. The first docking portion and the second docking portion are magnets which are capable of being magnetically attracted to each other, the male end of the rail assembly is docked with the female end of the rail assembly by the magnetic attraction between the first docking portion and the second docking portion, and the male end of the rail assembly is magnetically attracted to the female end of the rail assembly, so that the male structure is aligned with the female structure, and the male structure is inserted into the female structure, in this way, the conventional game console is completed being assembled.

However, when the conventional game console is applied, this structural design of the conventional game console has the following shortcomings. Firstly, the male end of the rail assembly protrudes beyond a side wall of the male structure, if a user independently operates the male structure, the user inadvertently drops the male structure to the ground, the male end of the rail assembly is apt to suffer a collision to be damaged. Moreover, because a further limiting structure between the female end of the rail assembly and the male end of the rail assembly is lacked, when the conventional game console is collided by an external force, the first docking portion and the second docking portion are susceptible by the external force to slide, and a derailment condition between the male end of the rail assembly and the female end of the rail assembly is caused. As a result, an assembling stability of the female structure and the male structure is affected.

Therefore, in view of the above-mentioned shortcomings, it is necessary to provide an innovative game console which includes a detachable handle part and enhances an assembling stability.

BRIEF SUMMARY OF THE INVENTION

An object of the present invention is to provide a game console which includes a detachable handle part and enhances an assembling stability. The game console includes a main body, at least one sliding block, at least one handle part, at least one sliding rail, at least one limiting structure, at least one elastic element and at least one push button. At least one outer surface of the main body is recessed inward to form at least one fixing groove. An upper portion of a rear inner wall of the at least one fixing groove is recessed rearward to form a restricting groove. The at least one sliding block is fixed in the at least one fixing groove. An inside of the at least one sliding block has an accommodating groove recessed inward from an inner surface of the at least one sliding block, and a limiting hole penetrating through a rear of the at least one sliding block. The at least one handle part is detachably mounted to at least one side of the main body. The at least one sliding rail is disposed to one side surface of the at least one handle part which faces the main body. The at least one sliding rail is matched with the at least one sliding block, and the at least one sliding block is slidably assembled with the at least one sliding rail. An outer surface of an upper portion of a rear of the at least one sliding rail is recessed inward and opposite to the main body to form a notch. The limiting hole is corresponding to the notch. The at least one limiting structure is movably assembled to an inner surface of the at least one sliding block. The at least one limiting structure has a buckling block. The buckling block is limited in the limiting hole. The buckling block projects beyond the rear of the at least one sliding block. The buckling block is restricted in the restricting groove. The at least one elastic element elastically abuts between the at least one limiting structure and a front inner wall of the accommodating groove of the at least one sliding block. The at least one push button is mounted to a rear of the main body. The at least one push button keeps abutting against the at least one limiting structure. When the at least one sliding block fully slides into the at least one sliding rail, the at least one elastic element is located at an original status, the buckling block is buckled in the notch to prevent the at least one handle part breaking away from the main body. When the at least one push button is pressed, the at least one push button keeps pressing against the at least one limiting structure, and the at least one limiting structure compresses the at least one elastic element along a pressing direction of the at least one push button, the buckling block is receded from the notch along the pressing direction of the at least one push button, the at least one handle part is detached from the main body along a sliding direction of the at least one handle part.

Another object of the present invention is to provide a game console. The game console includes a main body, two sliding blocks, two handle parts, two sliding rails, two limiting modules and two push buttons. Two middles of two outer surfaces of the main body are recessed inward to form two fixing grooves. An upper portion of a rear inner wall of each fixing groove is recessed rearward to form a restricting groove. The two sliding blocks are fixed in the two fixing grooves. Each sliding block has a base portion. An upper portion of an inner surface of the base portion of each sliding block is recessed inward to form an accommodating groove. An outside of a rear of the accommodating groove extends rearward to form a limiting hole. The two handle parts are detachably mounted to two opposite sides of the main body. The two sliding rails are disposed to two side surfaces of the two handle parts which face the main body. The two sliding blocks are matched with the two sliding rails. The two sliding rails are slidably assembled with the two sliding blocks. Each sliding rail has a base plate. A front and a rear of the base plate protrude perpendicular to the base plate and towards the main body to form two lateral walls. Two tail ends of the two lateral walls protrude towards each other to form two covering walls. Two upper portions of the two rear covering walls of the two sliding rails are cut off to form two notches. The two limiting holes of the two sliding blocks are disposed corresponding to the two notches of the two sliding rails. The two limiting modules are mounted to the two sliding blocks. Each limiting module includes a limiting structure and an elastic element. The two limiting structures of the two limiting modules are assembled to two inner surfaces of the two base portions of the two sliding blocks. The limiting structure has a buckling block. The buckling block is limited in the limiting hole. The two buckling blocks of the two limiting structures project beyond two rear surfaces of the two sliding blocks. The two buckling blocks of the two limiting structures are restricted in the two restricting grooves of the main body. The elastic element elastically abuts between the limiting structure and a front inner wall of the accommodating groove of one sliding block. The two push buttons are mounted in the main body. The two push buttons are exposed to a rear surface of the main body. The two push buttons keep abutting against the two limiting structures of the two limiting modules. When the two sliding blocks fully slide into the two sliding rails, the two elastic elements of the two limiting modules are located at original statuses, the two buckling blocks are buckled in the two notches of the two sliding rails to prevent the two handle parts breaking away from the main body. When each push button is pressed, the push button keeps pressing against the limiting structure of one limiting module, and the limiting structure compresses the elastic element along a pressing direction of the push button, the buckling block is receded from one notch of the sliding rail of one handle part along the pressing direction of the push button, the one handle part is detached from the main body along a sliding direction of the one handle part.

Another object of the present invention is to provide a game console. The game console includes a main body; a sliding block fixed to the main body, the sliding block having a fixing pillar, an accommodating groove and a limiting hole, the accommodating groove penetrated through an inner surface of the sliding block, the limiting hole penetrated through a rear surface of the sliding block and communicated with the accommodating groove; a handle part detachably mounted to the main body; a sliding rail disposed to a side surface of the handle part, the sliding rail being slidably assembled with the sliding block; a limiting module mounted to the sliding block, the limiting module having a limiting structure having a base board, an extension portion, extended from the base board and received in the accommodating groove, a buckling block, extended from the extension portion and received in the limiting hole, free end of the bucking block extended out of the limiting hole and latched with the sliding rail, a pressing pillar, extended from the base board, a protruding pillar, extended from the extended portion and received in the accommodating groove, and an elastic element, elastically abutting between the protruding pillar and an inner wall of the accommodating groove; and a push button mounted in the main body, the push button being exposed to a rear surface of the main body, the push button keeping contacting the pressing pillar, a pivot structure interconnected the limiting module and the sliding block, the pivot structure having a fixing pillar and a fixing ring, the fixing pillar being extended from the inner surface of the sliding block, the fixing ring being extended from the base board; wherein when the sliding block fully slide into the sliding rail, the elastic element of the limiting module is located at an original status, the buckling block engages the sliding rail, and wherein when the push button is pressed, the push button keeps pressing against the pressing pillar, and the protruding pillar compresses the elastic element along a pressing direction of the push button, the buckling block disengages from the sliding rail, the handle part is detached from the main body.

As described above, the game console includes the main body, the two handle parts detachably mounted to the main body, the two limiting modules disposed to the main body, and the two push buttons mounted in a housing of the main body. The two push buttons are exposed to a rear surface of the main body. The two handle parts are electrically connected with the main body, the two push buttons contact with the two limiting modules, and the two push buttons press the two limiting modules. Furthermore, each handle part has the sliding rail, the two upper portions of the two rear covering walls of the two sliding rails are cut off to form the two notches, the two middles of the two opposite outer surfaces of the main body are equipped with the two sliding blocks, two protruding blocks of the two sliding blocks slide in the two sliding rails along a sliding direction of the two sliding blocks, each limiting module has the buckling block, the two buckling blocks of the two limiting modules are buckled in the two notches, so that the two sliding blocks are slidably fastened in the two sliding rails, and the two sliding blocks are slidably limited in the two sliding rails, an assembling stability of the two sliding blocks and the two sliding rails is improved. In addition, when a user exerts a pressing force to press a contact portion of each push button, the buckling block is receded from the restricting groove of the rear inner wall of each fixing groove and the one notch of the sliding rail of the one handle part along the pressing direction of the push button, a limiting status of the one sliding block and the sliding rail of the one handle part is eliminated, so the one handle part is detached from the main body along the sliding direction of the one handle part. As a result, the game console includes the two detachable handle parts and enhances an assembling stability of the game console.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
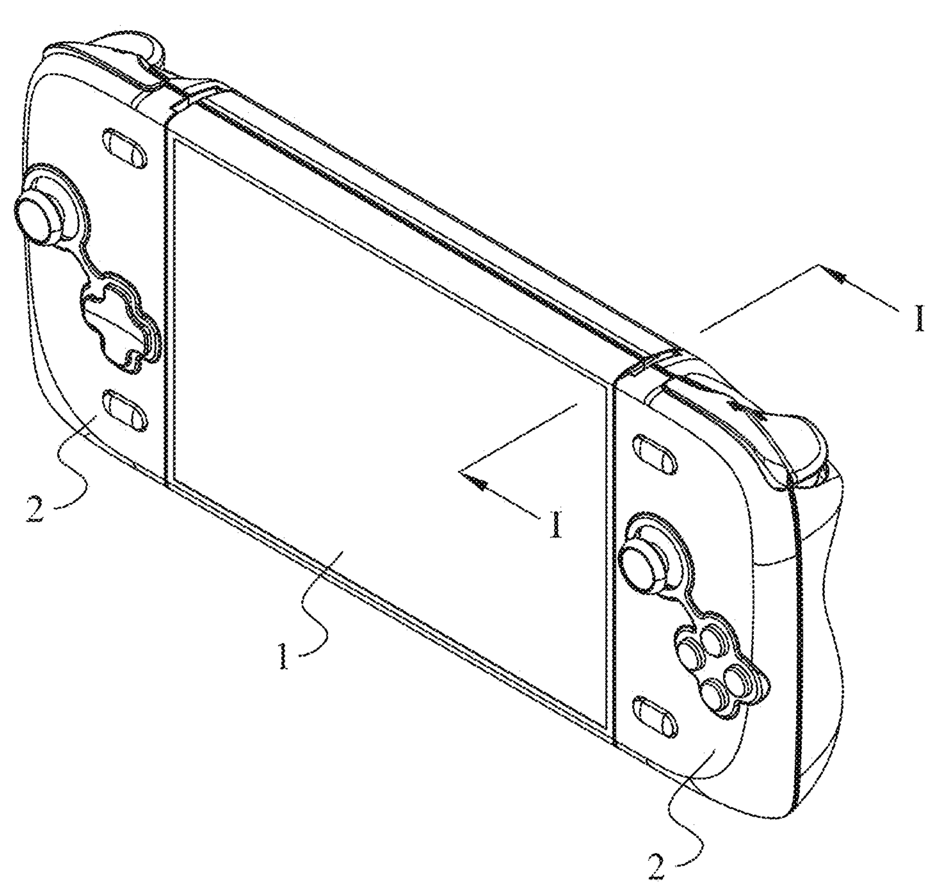
FIG. 1 is a perspective view of a game console in accordance with a preferred embodiment of the present invention.
Figure 2:
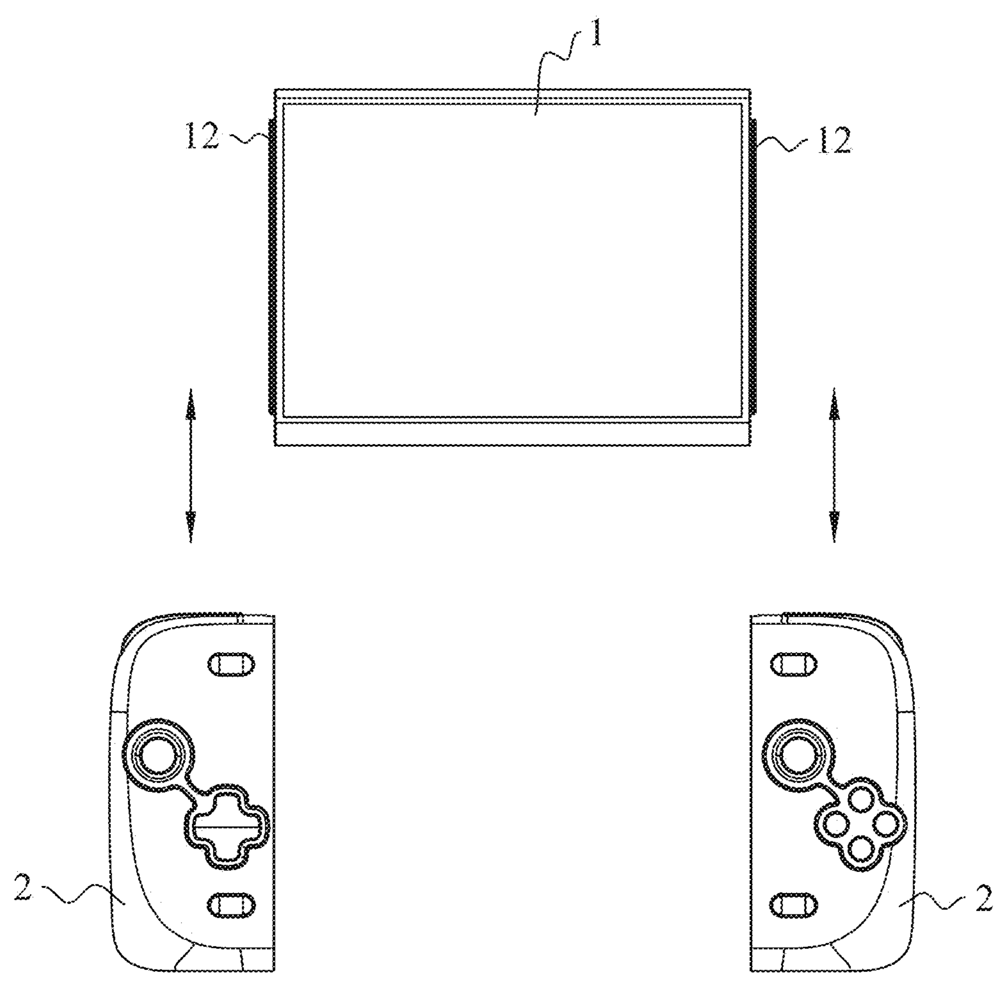
FIG. 2 is a schematic diagram showing that a handle part is assembled to or detached from a main body along a sliding direction of the game console according to the preferred embodiment of the present invention.
Figure 3:
FIG. 3 is an exploded view of the game console in accordance with the preferred embodiment of the present invention.
Figure 3:
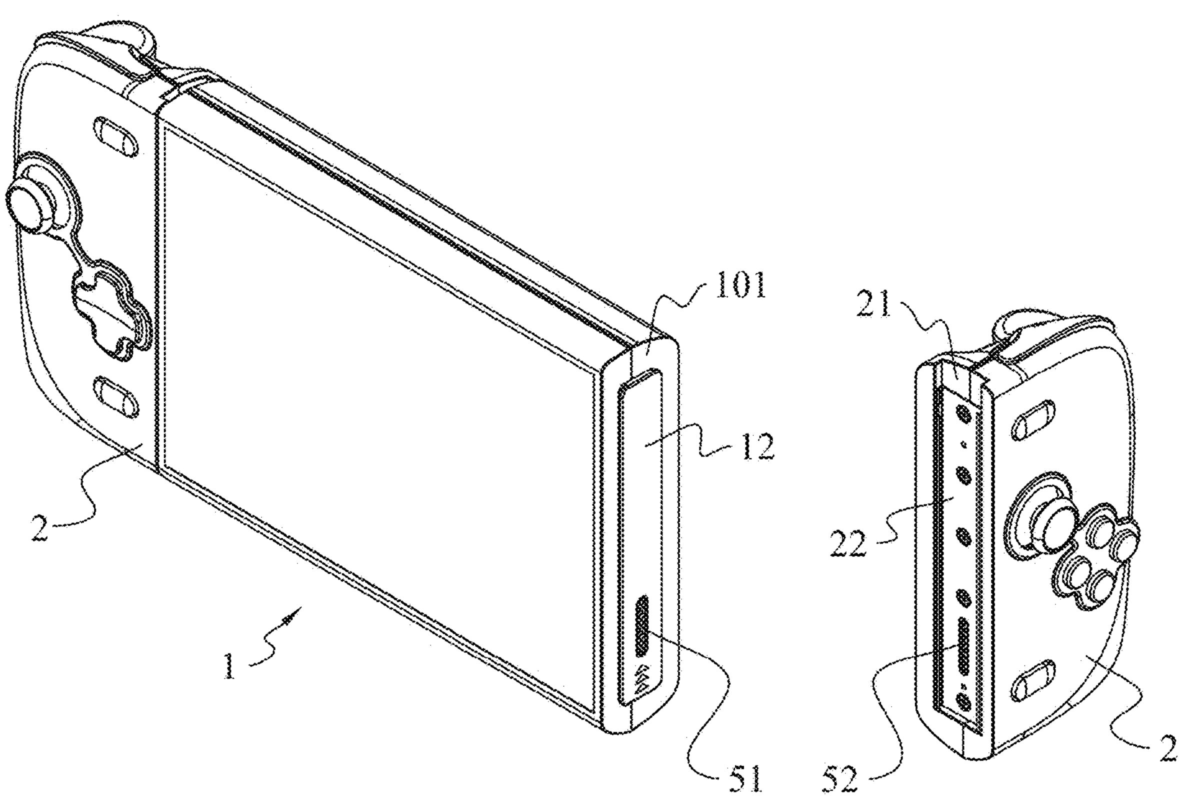
Figure 4:
FIG. 4 is another exploded view of the game console in accordance with the preferred embodiment of the present invention.
Figure 4:
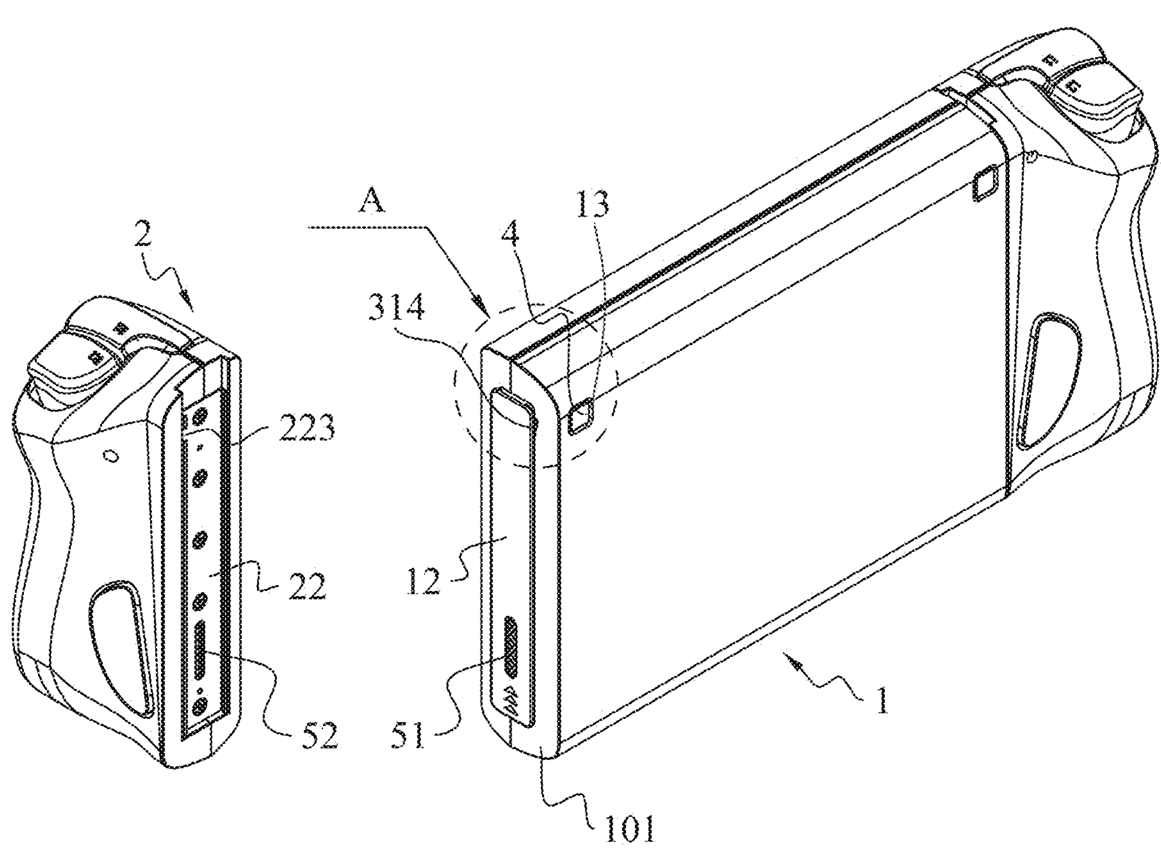
Figure 5:
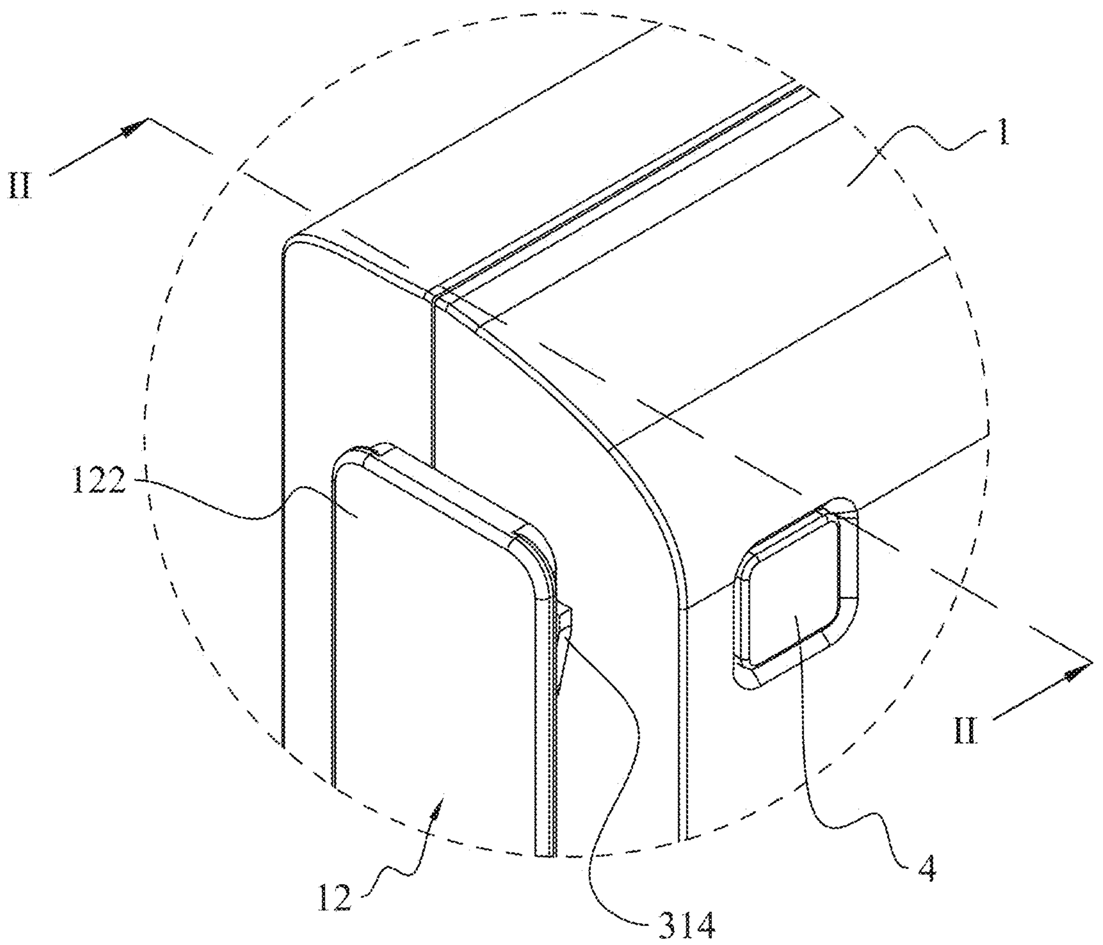
FIG. 5 is an enlarged view of an encircled portion A of the game console of FIG. 4.
Figure 6:
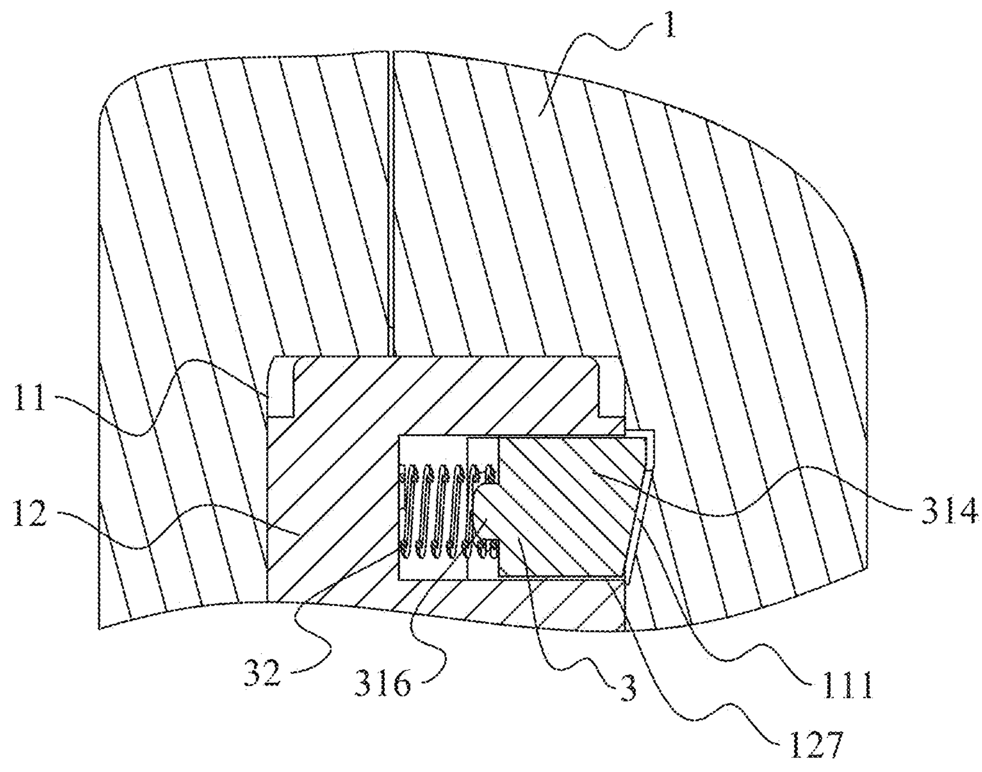
FIG. 6 is a sectional view of the game console along a line II-II of FIG. 5.
Figure 7:
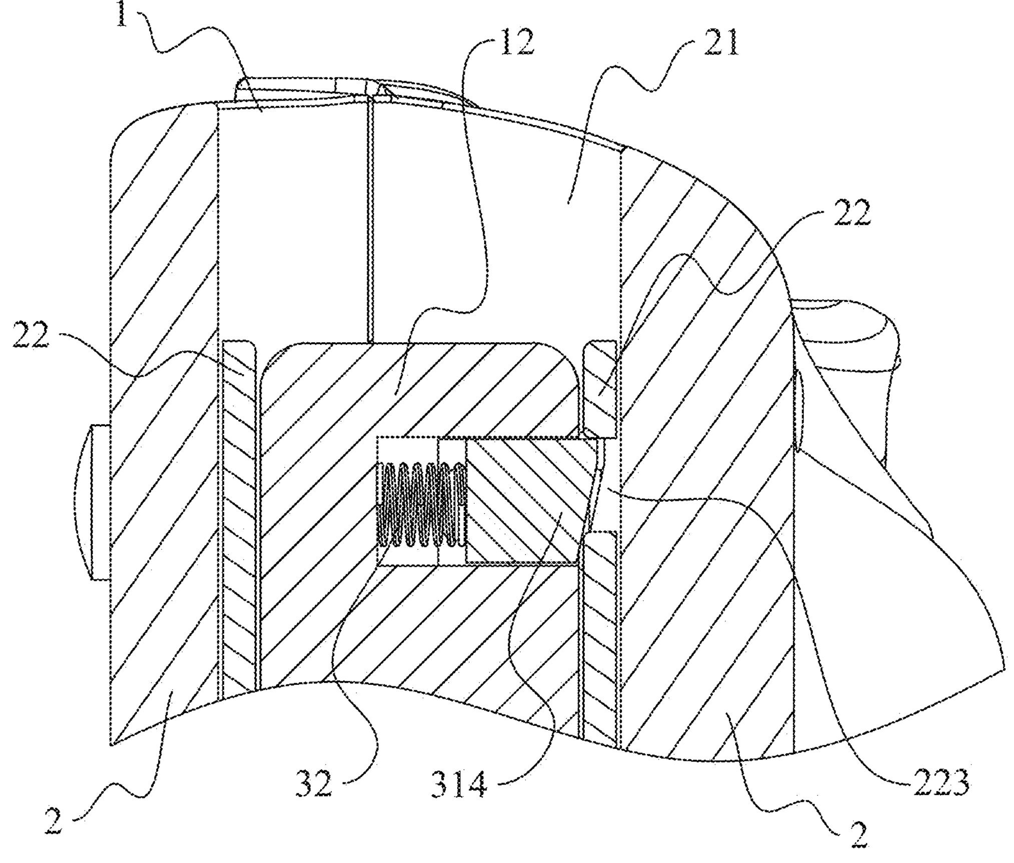
FIG. 7 is a sectional view of the game console along a line I-I of FIG. 1.

Referring to FIG. 1 and FIG. 2, a game console 100 in accordance with a preferred embodiment of the present invention is shown. The game console 100 includes a main body 1, and at least one handle part 2 detachably mounted to at least one side of the main body 1. In the preferred embodiment, the game console 100 includes two handle parts 2 detachably mounted to two opposite sides of the main body 1.

Referring to FIG. 1 to FIG. 12, the at least one handle part 2 has at least one sliding rail 22 disposed to one side surface of the at least one handle part 2 which faces the main body 1. A middle of at least one outer surface of the main body 1 is equipped with at least one sliding block 12. The at least one outer surface of the main body 1 is recessed inward to form at least one fixing groove 11. The at least one sliding block 12 is fixed in the at least one fixing groove 11. An upper portion of a rear inner wall of the at least one fixing groove 11 is recessed rearward to form a restricting groove 111. The at least one sliding rail 22 is matched with the at least one sliding block 12, and the at least one sliding block 12 is slidably assembled with the at least one sliding rail 22. An inside of the at least one sliding block 12 has an accommodating groove 124 recessed inward from an inner surface of the at least one sliding block 12, and a limiting hole 125 penetrating through a rear of the at least one sliding block 12. An outer surface of an upper portion of a rear of the at least one sliding rail 22 is recessed inward and opposite to the main body I to form a notch 223. The game console 100 includes at least one limiting module 3 and at least one push button 4. The at least one limiting module 3 includes at least one limiting structure 31 and at least one elastic element 32. The at least one limiting structure 31 is movably assembled to an inner surface of the at least one sliding block 12. The at least one limiting structure 31 has a buckling block 314. The buckling block 314 is limited in the limiting hole 125. The buckling block 314 projects beyond the rear of the at least one sliding block 12. The buckling block 314 is restricted in the restricting groove 111. The at least one elastic element 32 elastically abuts between the at least one limiting structure 31 and a front inner wall of the accommodating groove 124 of the at least one sliding block 12. The at least one push button 4 is mounted to a rear of the main body 1. The at least one push button 4 keeps abutting against the at least one limiting structure 31.

When the at least one sliding block 12 fully slides into the at least one sliding rail 22, the at least one elastic element 32 is located at an original status, the buckling block 314 is buckled in the notch 223 to prevent the at least one handle part 2 breaking away from the main body 1.

When the at least one push button 4 is pressed, the at least one push button 4 keeps pressing against the at least one limiting structure 31, and the at least one limiting structure 31 compresses the at least one elastic element 32 along a pressing direction of the at least one push button 4, the buckling block 314 is receded from the notch 223 along the pressing direction of the at least one push button 4, the at least one handle part 2 is detached from the main body I along a sliding direction of the at least one handle part 2.

In the preferred embodiment, the main body 1 is shown as a rectangular shape. Two middles of two opposite outer surfaces of the main body 1 are equipped with two sliding blocks 12. The two sliding blocks 12 are rectangular. Two outer surfaces of the two sliding blocks 12 are parallel to the two opposite outer surfaces of the main body 1. Each handle part 2 has the sliding rail 22. The game console 100 includes two sliding rails 22. The two sliding rails 22 are disposed to two side surfaces of the two handle parts 2 which face the main body 1. The two sliding blocks 12 are matched with the two sliding rails 22. The two sliding rails 22 are slidably assembled with the two sliding blocks 12. Two outer portions of a front surface and a rear surface of each sliding block 12 longitudinally protrude oppositely to form two sliding portions 123. An inside of each sliding block 12 defines a buckling hole 127 penetrating through an upper portion of an inner portion of the rear surface of each sliding block 12.

Figure 8:
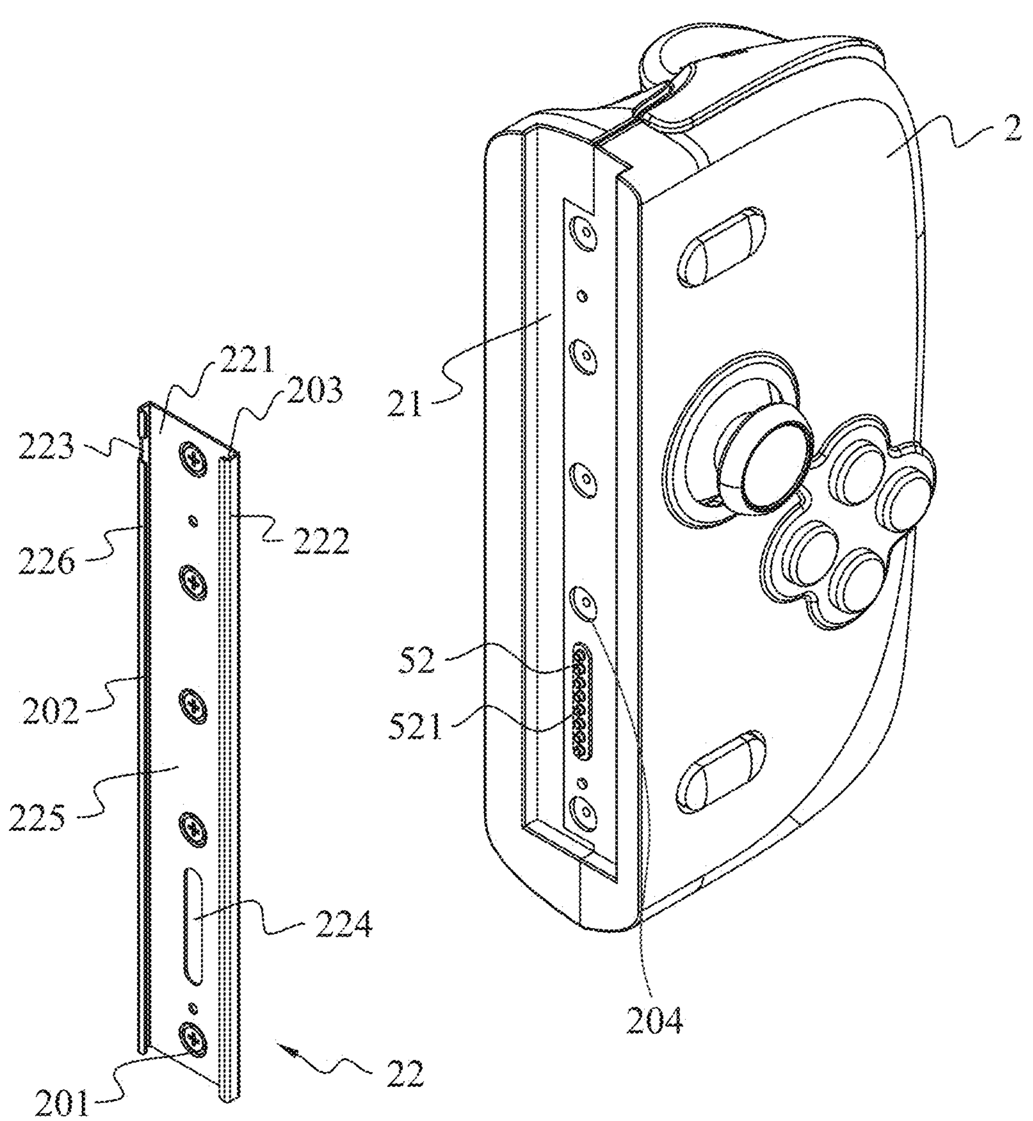
FIG. 8 is an exploded view of the handle part and a sliding rail of the game console in accordance with the preferred embodiment of the present invention.
Figure 9:
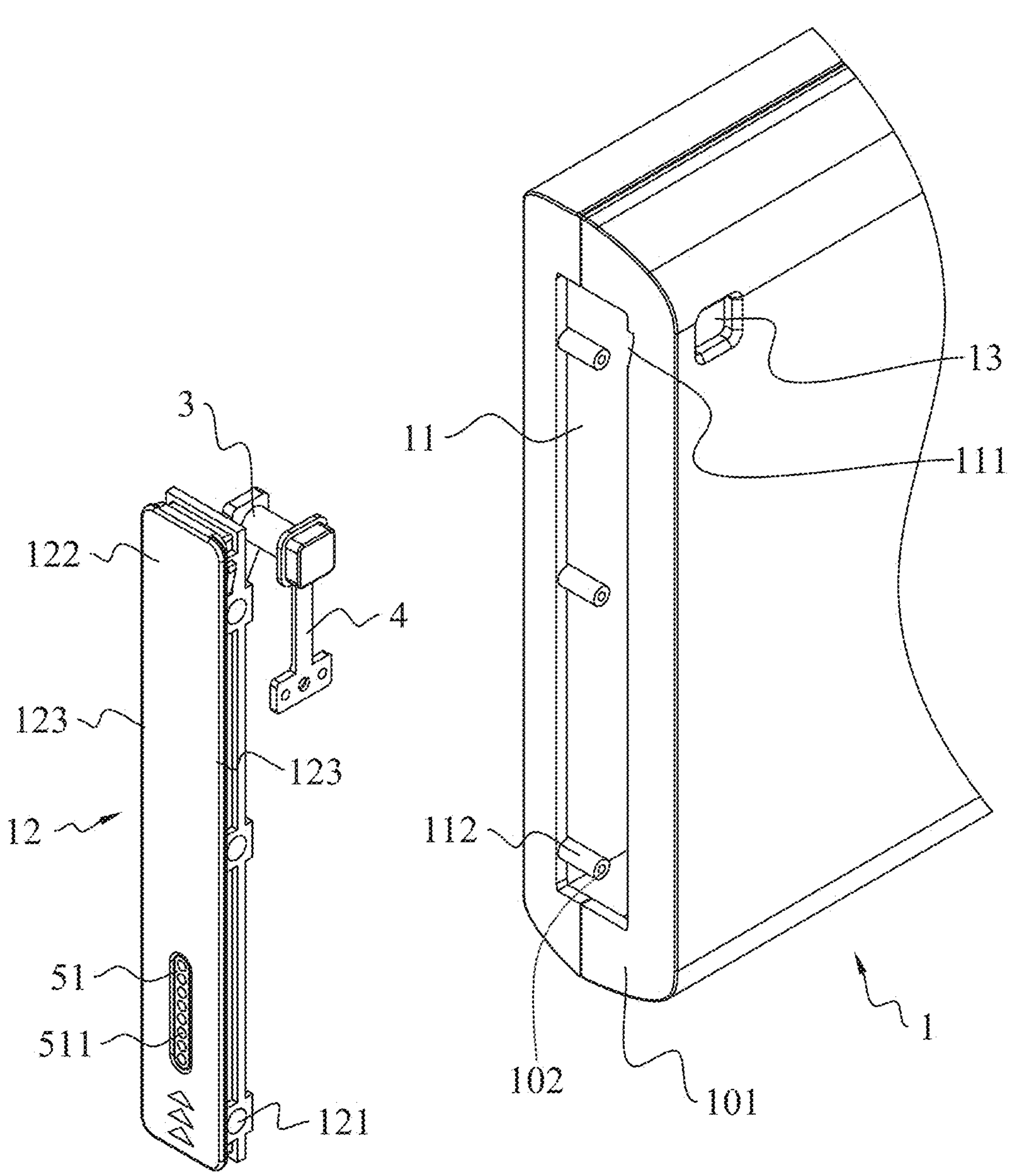
FIG. 9 is an exploded view of the main body, a sliding block, a limiting module and a push button of the game console according to the preferred embodiment of the present invention.
Figure 10:
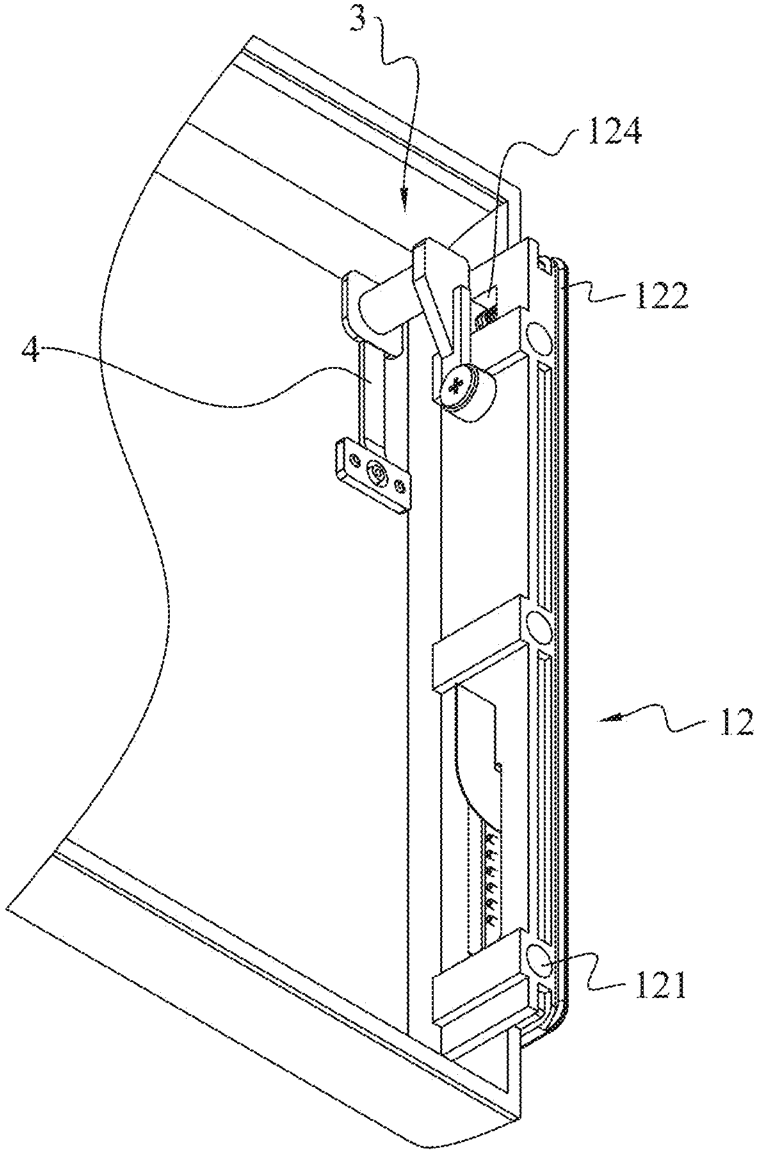
FIG. 10 is a perspective view of the main body, the sliding block, the limiting module and the push button of the game console according to the preferred embodiment of the present invention.
Figure 11:
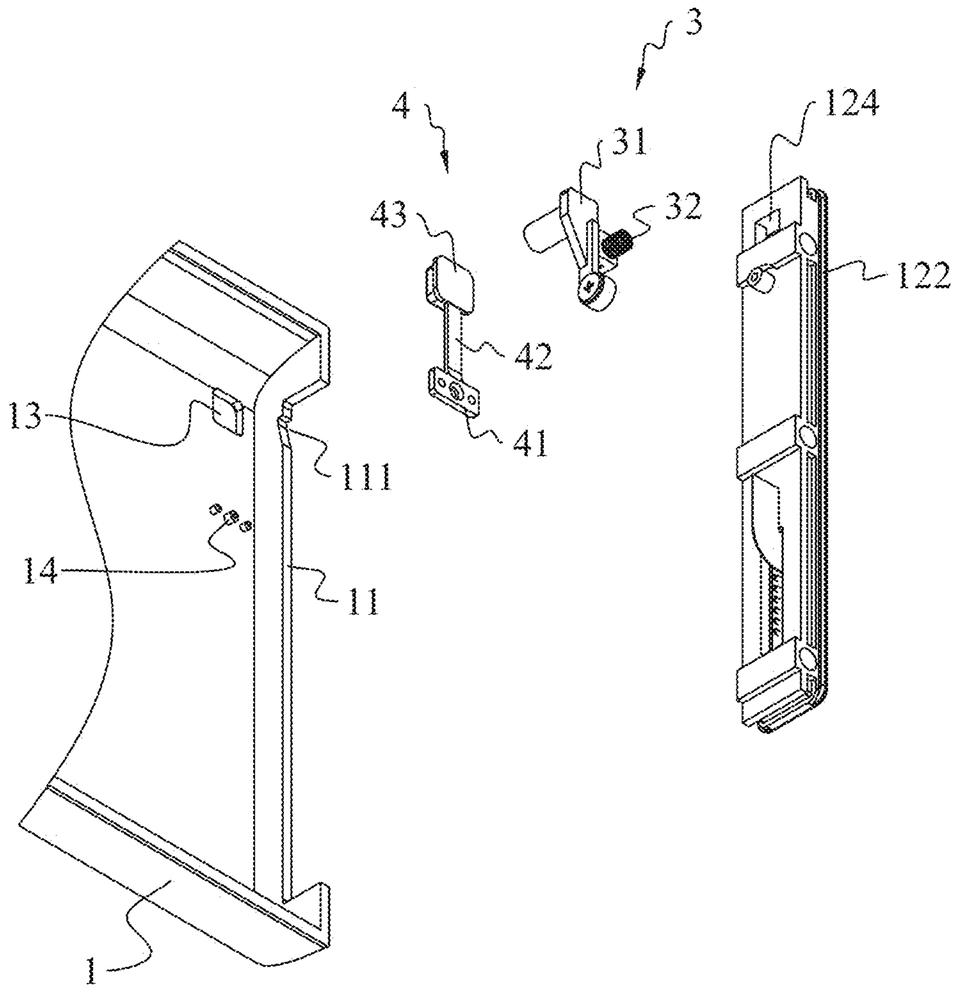
FIG. 11 is another exploded view of the main body, the sliding block, the limiting module and the push button of the game console in accordance with the preferred embodiment of the present invention.
Figure 12:
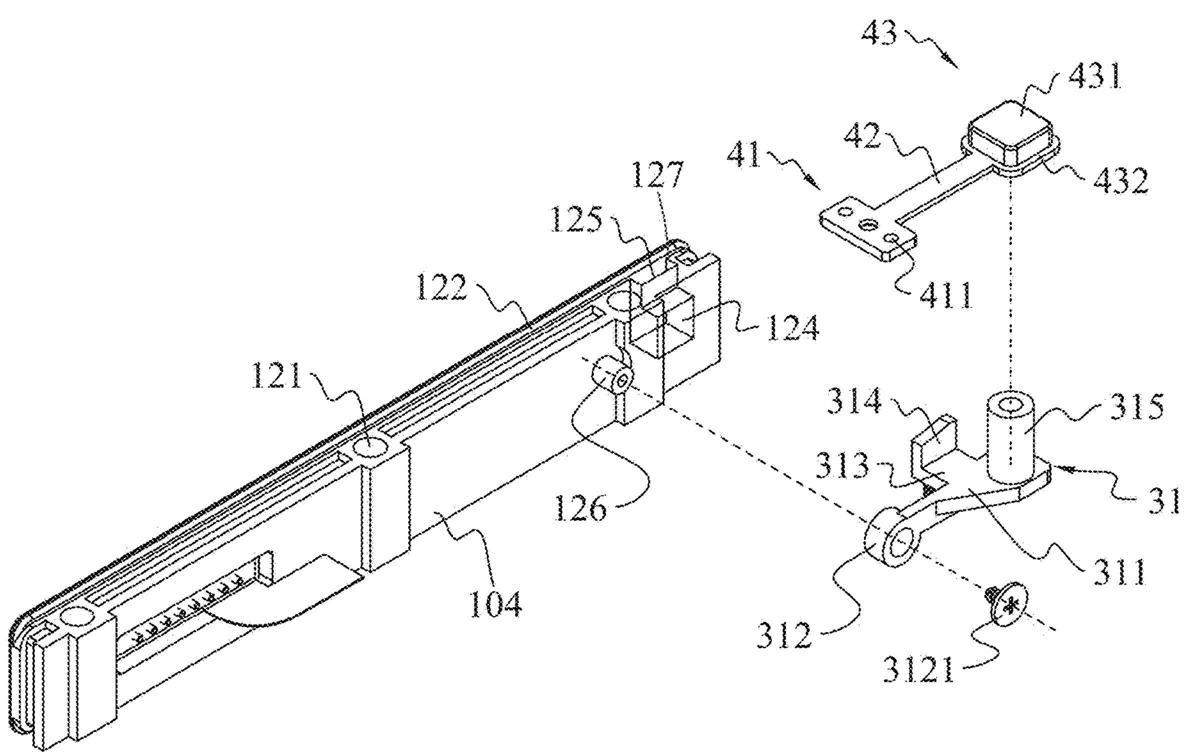
FIG. 12 is an exploded view of the sliding block, the limiting module and the push button of the game console in accordance with the preferred embodiment of the present invention
Figure 13:
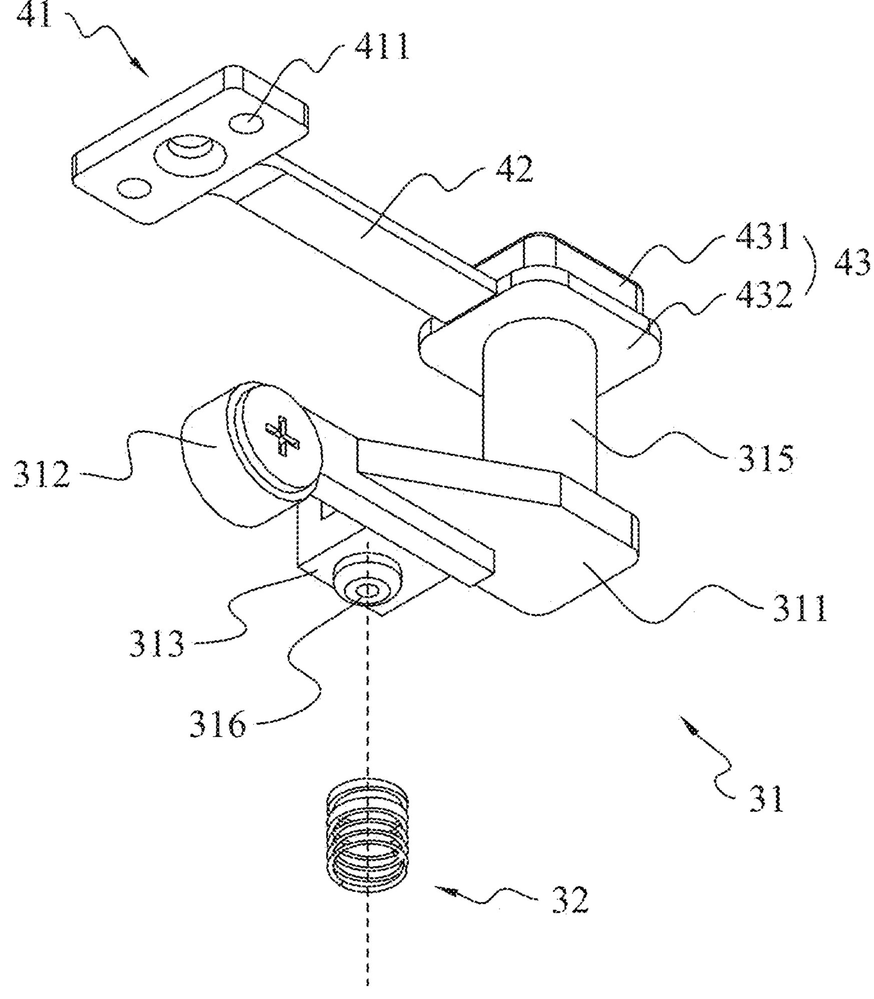
FIG. 13 is an exploded view of the limiting module and the push button of the game console in accordance with the preferred embodiment of the present invention.
Figure 14:
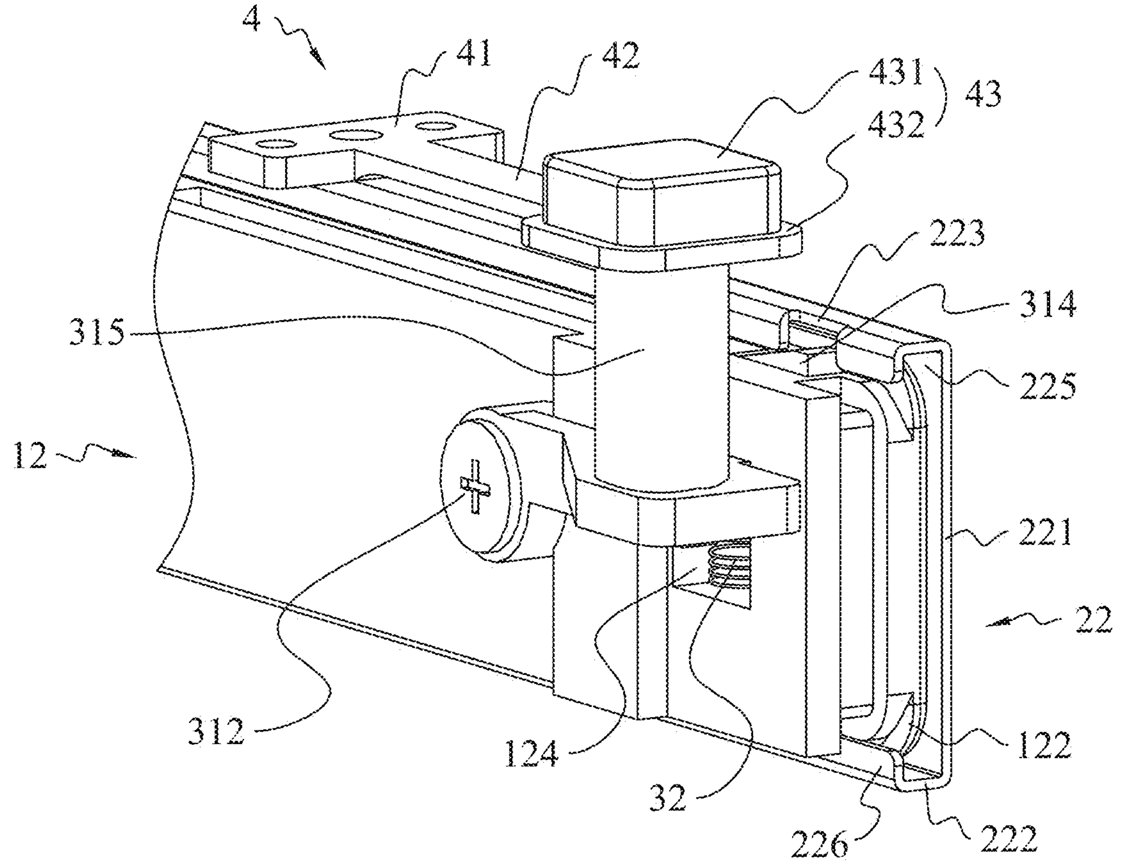
FIG. 14 is a partially perspective view of the game console in accordance with the preferred embodiment of the present invention.

Referring to FIG. 8, each sliding rail 22 has a base plate 221, two lateral walls 222 and two covering walls 226. A middle of an outer surface of each sliding rail 22 is recessed inward and longitudinally extends oppositely to form a sliding groove 225 penetrating through a top surface and a bottom surface of each sliding rail 22. The base plate 221 is rectangular. The two base plates 221 of the two sliding rails 22 further define a plurality of screwing holes 201. A front and a rear of each sliding rail 22 has two L-shaped blocking walls 202. The sliding groove 225 of each sliding rail 22 is disposed between the two blocking walls 202. Two mouths 203 of the two L-shaped blocking walls 202 face each other. A front and a rear of the sliding groove 225 are defined as the two mouths 203 of the two L-shaped blocking walls 202. Each blocking wall 202 includes one lateral wall 222 and one covering wall 226. The two blocking walls 202 are positioned along a front-to-rear direction.

An outer surface of an upper portion of the rear blocking wall 202 of each sliding rail 22 is recessed inward and opposite to the main body 1 to form the notch 223. The notch 223 penetrates through a front surface of the rear blocking wall 202 and extends to the mouth 203 of the rear blocking wall 202. The notch 223 of the rear blocking wall 202 of one sliding rail 22 is communicated with the sliding groove 225 of the one sliding rail 22. The notch 223 of the rear blocking wall 202 of the other sliding rail 22 is communicated with the sliding groove 225 of the other sliding rail 22.

One side surface of each handle part 2 facing towards the main body 1 is recessed inward and opposite to the main body 1 to form a locating groove 21. The two base plates 221 of the two sliding rails 22 are flatly affixed to two inner side walls of the two locating grooves 21 of the two handle parts 2. A front and a rear of the base plate 221 protrude perpendicular to the base plate 221 and towards the main body 1 to form the two lateral walls 222. Two tail ends of the two lateral walls 222 protrude towards each other to form the two covering walls 226. The two covering walls 226 are perpendicular to the two lateral walls 222. Two upper portions of the two rear covering walls 226 of the two sliding rails 22 are cut off to form the two notches 223. The base plate 221, the two lateral walls 222 and the two covering walls 226 of each sliding rail 22 together surround one sliding groove 225. The two inner side walls of the two locating grooves 21 define a plurality of locating holes 204. The two sliding rails 22 are locked in the two locating grooves 21 by the plurality of the screwing holes 201 and the plurality of the locating holes 204. The base plate 221 defines an opening 224 penetrating through the base plate 221 along a transverse direction.

Referring to FIGS. 2 to 10, in order to make a connection between the main body 1 and the two handle parts 2 more stable, the game console 100 further includes two limiting modules 3. The two limiting modules 3 are mounted to the two sliding blocks 12. The two limiting modules 3 are movably fixed to the two sliding blocks 12. Each limiting module 3 includes the limiting structure 31 and the elastic element 32. The limiting structure 31 of each limiting module 3 has the buckling block 314. The two buckling blocks 314 of the two limiting modules 3 project out from the two buckling holes 127 of the two rear surfaces of the two sliding blocks 12. The two buckling blocks 314 of the two limiting structures 31 project beyond the two rear surfaces of the two sliding blocks 12. When the two sliding blocks 12 are fully slid into the two sliding rails 22, the two buckling blocks 314 of the two limiting modules 3 are buckled in the two notches 223 of the two sliding rails 22, so that the two handle parts 2 are avoided accidentally breaking away from the main body 1.

In order to electrically connect the two handle parts 2 with the main body 1, each sliding block 12 is equipped with a first connection end 51, the sliding rail 22 of each handle part 2 is equipped with a second connection end 52, the two first connection ends 51 of the two sliding blocks 12 are exposed out of the two outer surfaces of the two sliding blocks 12, and the two second connection ends 52 of the two sliding rails 22 are exposed out of the two outer surfaces of the two sliding rails 22. When the two sliding blocks 12 are fully slid into the two sliding rails 22, the two second connection ends 52 are accommodated in the two openings 224 of the two sliding rails 22, the two first connection ends 51 contact with the two second connection ends 52, and the two first connection ends 51 are electrically conductive with the two second connection ends 52.

Referring to FIG. 8, a depth of the locating groove 21 of each handle part 2 is greater than a thickness of the sliding rail 22 of each handle part 2 along the transverse direction. The two sliding rails 22 are located in the two locating grooves 21 of the two handle parts 2, so the two sliding rails 22 are less susceptible to be collided to be damaged.

Referring to FIG. 8 to FIG. 11, the main body 1 has a hollow housing 101. In the preferred embodiment, two middles of the two outer surfaces of the main body 1 are recessed inward to form two fixing grooves 11. The two sliding blocks 12 are fixed in the two fixing grooves 11. An upper portion of a rear inner wall of each fixing groove 11 is recessed rearward to form the restricting groove 111. The buckling block 314 is restricted in the restricting groove 111. A front inner wall of each fixing groove 11 extends rearward to form a hollow fixing pillar 112. Specifically, several portions of the front inner wall of each fixing groove 11 extend rearward to form a plurality of the hollow fixing pillars 112. Middles of the plurality of the fixing pillars 112 define a plurality of fixing holes 102 penetrating through rear surfaces of the plurality of the fixing pillars 112. A plurality of screw bolts are fixed in the fixing holes 102 of the plurality of the fixing pillars 112.

The two sliding blocks 12 define two retaining holes 121 transversely penetrating through two middles of the two sliding blocks 12. Specifically, the two sliding blocks 12 define a plurality of retaining holes 121 transversely penetrating through the two middles of the two sliding blocks 12. An inner peripheral surface of each retaining hole 121 protrudes inward to form a ring-shaped stopping wall (not shown). The plurality of the fixing pillars 112 are fixed in the plurality of the retaining holes 121, and the plurality of the fixing pillars 112 resist against the stopping walls (not shown) of the plurality of the retaining holes 121. A plurality of screw bolts (not shown) pass through middles of the stopping walls (not shown) of the plurality of the retaining holes 121, the plurality of the screw bolts are fixed in the fixing holes 102 of the plurality of the fixing pillars 112, and each stopping wall (not shown) is clamped between one fixing pillar 112 and one screw bolt, so that the two sliding blocks 12 are fixed in the two fixing grooves 11.

Specifically, each sliding block 12 has a base portion 104, and a protruding block 122 extended outward from an outer periphery of the base portion 104. A front and a rear of the protruding block 122 are defined as the two sliding portions 123. The plurality of the retaining holes 121 transversely penetrate through the base portions 104 of the two sliding blocks 12. The two base portions 104 of the two sliding blocks 12 are fixed in the two fixing grooves 11. The two protruding blocks 122 of the two sliding blocks 12 are correspondingly disposed beyond the two outer surfaces of the main body 1. The protruding block 122 is rectangular. The protruding block 122 is arranged parallel to the two outer surfaces of the main body 1.

When the two handle parts 2 are assembled to the main body 1, the two protruding blocks 122 of the two sliding blocks 12 are disposed parallel to the two base plates 221 of the two sliding rails 22, the two protruding blocks 122 of the two sliding blocks 12 slide in the two sliding rails 22 along a sliding direction of the two sliding blocks 12, the two sliding rails 22 of the two handle parts 2 slide upward along the two protruding blocks 122 of the two sliding blocks 12, so the two protruding blocks 122 of the two sliding blocks 12 slide into the two sliding grooves 225 of the two sliding rails 22, and the two protruding blocks 122 of the two sliding blocks 12 are slidably received in the two sliding grooves 225 of the two sliding rails 22 along the sliding direction of the two sliding blocks 12. The base plate 221, the two lateral walls 222 and the two covering walls 226 of each sliding rail 22 enclose the protruding block 122 of one sliding block 12 so as to prevent the two protruding blocks 122 of the two sliding blocks 12 breaking away from the two sliding rails 22. The sliding portions 123 of the two sliding blocks 12 are enclosed by the blocking walls 202 of the two sliding rails 22. When the two sliding blocks 12 fully slide into the two sliding rails 22, the two elastic elements 32 of the two limiting modules 3 are located at the original statuses, the two buckling blocks 314 are buckled in the two notches 223 of the two sliding rails 22 to prevent the two handle parts 2 breaking away from the main body 1.

Referring to FIG. 4, FIG. 9, FIG. 11 and FIG. 12, two upper portions of two sides of a rear of the housing 101 define two button holes 13 penetrating through the rear of the housing 101. The game console 100 further includes two push buttons 4. The two push buttons 4 are mounted in the two button holes 13 of the housing 101 of the main body 1. An inner surface of the rear of the housing 101 protrudes inward to form a protrusion 14. The protrusion 14 is located under the two button holes 13, and the protrusion 14 is next to the two button holes 13. Each push button 4 includes a fastening end 41 positioned at the inner surface of the rear of the housing 101, a flexible arm 42 extended upward from a middle of a top of the fastening end 41, and a movable end 43 extended upward and transversely expanded from a free end of the flexible arm 42. The fastening end 41 defines a fastening hole 411 penetrating through the fastening end 41.

The movable end 43 has a contact portion 431 and an abutting portion 432. The abutting portion 432 is extended upward and transversely expanded oppositely from the free end of the flexible arm 42. The contact portion 431 is protruded rearward from a middle of a rear surface of the abutting portion 432. The two contact portions 431 of the two push buttons 4 are assembled in the two button holes 13 for a user to press the two contact portions 431 of the two push buttons 4. Two rear surfaces of the two abutting portions 432 of the two push buttons 4 abut against the inner surface of the rear of the housing 101. The two abutting portions 432 of the two push buttons 4 are positioned corresponding to the two button holes 13 of the housing 101. The protrusion 14 is assembled in the fastening hole 411 of the fastening end 41, and a peripheral wall of the fastening hole 411 is combined with the protrusion 14 by a hot melting way, so that after the user exerts a pressing force on the contact portion 431 of each push button 4, each push button 4 rebounds to be restored to an original position by an elastic deformation of the flexible arm 42 of each push button 4.

Referring to FIG. 9 to FIG. 12, because the two handle parts 2 are damageable, the two handle parts 2 are designed to be detachable from the main body 1 to reduce a maintained cost of the game console 100. In the preferred embodiment, the two limiting modules 3 are mounted inside the housing 101 of the main body 1, and the two limiting modules 3 are positioned to two inner surfaces of the two sliding blocks 12 which are away from the two protruding blocks 122 of the two sliding blocks 12, the two limiting modules 3 contact with two front surfaces of the two abutting portions 432 of the two push buttons 4, and the two limiting modules 3 abut against the two front surfaces of the two abutting portions 432 of the two push buttons 4. The two push buttons 4 keep abutting against the two limiting structures 31 of the two limiting modules 3.

In the preferred embodiment, the inside of each sliding block 12 has the accommodating groove 124 and the limiting hole 125. The buckling hole 127 includes the accommodating groove 124 and the limiting hole 125. The limiting hole 125 is corresponding to the notch 223. An upper portion of an inner surface of the base portion 104 of each sliding block 12 is recessed inward to form the accommodating groove 124. An outside of a rear of the accommodating groove 124 extends rearward to form the limiting hole 125. The accommodating groove 124 is perpendicularly communicated with the limiting hole 125. The accommodating groove 124 is connected to an inside of the housing 101 of the main body 1. The limiting hole 125 faces towards the restricting groove 111 and the two button holes 13 of the main body 1. The two limiting holes 125 of the two sliding blocks 12 are disposed corresponding to the two notches 223 of the two sliding rails 22.

Referring to FIG. 11 to FIG. 14, In the preferred embodiment, the elastic element 32 is a compression spring. The elastic element 32 is able to be replaced by other flexible structures. The elastic element 32 and other flexible structures have the same effect. The limiting structure 31 has a base board 311. A bottom of the base board 311 extends downward to form a fixing ring 312. The fixing ring 312 is disposed inside the housing 101. The fixing ring 312 is equipped with a locking element 3121. The inner surface of the base portion 104 of each sliding block 12 protrudes inward and towards the main body 1 to form a hollow fixing pillar 126. The hollow fixing pillar 126 is disposed corresponding to the fixing ring 312. The fixing ring 312 is mounted to the inner surface of the base portion 104 which is away from the protruding block 122. The fixing pillar 126 is inserted into the fixing ring 312, and the fixing ring 312 is locked to the fixing pillar 126 by locking the locking element 3121 in the fixing pillar 126 and the fixing ring 312, so the two limiting structures 31 of the two limiting modules 3 are assembled to the two inner surfaces of the two base portions 104 of the two sliding blocks 12 which are away from the two protruding blocks 122 of the two sliding blocks 12. An outer side of the base board 311 of each limiting module 3 extends outward and towards the protruding block 122 of the one sliding block 12 to form an extension portion 313. The extension portions 313 of the two limiting modules 3 are received in the accommodating grooves 124 of the two sliding blocks 12.

A lower portion of one end of the base board 311 perpendicularly protrudes rearward to form the buckling block 314. An upper portion of the one end of the base board 311 of each limiting module 3 perpendicularly protrudes rearward and towards one push button 4 to form a pressing pillar 315. The other end of the base board 311 protrudes frontward to form a protruding pillar 316. The buckling blocks 314 of the two limiting modules 3 are accommodated in the two limiting holes 125 of the two sliding blocks 12. The two buckling blocks 314 of the two limiting modules 3 project out from the two limiting holes 125, the two buckling blocks 314 of the two limiting structures 31 of the two limiting modules 3 are restricted in the two restricting grooves 111 of the main body 1, and the two buckling blocks 314 of the two limiting modules 3 are buckled in the two notches 223 of the two sliding rails 22, so that the two sliding blocks 12 are slidably fastened in the two sliding rails 22, and the two sliding blocks 12 are slidably limited in the two sliding rails 22.

The two pressing pillars 315 of the two limiting modules 3 keep contacting with two front surfaces of the two abutting portions 432 of the two push buttons 4. A front surface of the extension portion 313 of each limiting module 3 protrudes frontward and in a direction which is away from the one push button 4 to form the protruding pillar 316. The elastic element 32 is mounted around the protruding pillar 316, and the protruding pillar 316 and the elastic element 32 are both positioned in the accommodating groove 124, the two protruding pillars 316 of the two limiting modules 3 cooperate with the two sliding blocks 12 to fasten each elastic element 32 between one protruding pillar 316 and the one sliding block 12, so that the elastic element 32 elastically abuts between the protruding pillar 316 of the limiting structure 31 and the front inner wall of the accommodating groove 124 of the one sliding block 12, and correspondingly, the two protruding pillars 316 of the two limiting modules 3 are elastically supported by the two elastic elements 32 of the two limiting modules 3 in the two accommodating grooves 124 of the two sliding blocks 12.

Referring to FIG. 1 to FIG. 14, when the user exerts the pressing force on the contact portion 431 of each push button 4, and the contact portion 431 of each push button 4 is pressed, the contact portion 431 of the push button 4 keeps pressing against the pressing pillar 315 of the limiting structure 31 of one limiting module 3, and the pressing pillar 315 brings along the limiting structure 31, the limiting structure 31 compresses the elastic element 32 along the pressing direction of the push button 4, so that the one limiting module 3 actuates with respect to the one sliding block 12, and the one limiting module 3 slides along the pressing direction of the push button 4, the buckling block 314 is receded from the restricting groove 111 of the rear inner wall of each fixing groove 11 and one notch 223 of the sliding rail 22 of one handle part 2 along the pressing direction of the push button 4, in this way, a limiting status of the one sliding block 12 and the sliding rail 22 of the one handle part 2 is eliminated, at the moment, the sliding rail 22 of the one handle part 2 slides downward along the protruding block 122 of the one sliding block 12, and the protruding block 122 of the one sliding block 12 slides away from the sliding groove 225 of the sliding rail 22 of the one handle part 2. In that case, the one handle part 2 is detached from the main body 1 along a sliding direction of the one handle part 2.

When the contact portion 431 is released, the one limiting module 3 and the push button 4 rebound back to original positions along a direction which is opposite to the pressing direction of the push button 4, and the elastic element 32 of the one limiting module 3 is located at the original status. The pressing direction of the push button 4 is orthogonal to the sliding direction of the one handle part 2.

In this preferred embodiment, the first connection end 51 has a connection pad 511. The second connection end 52 has a connection pin 521. Preferably, the first connection end 51 has a plurality of the connection pads 511. The second connection end 52 has a plurality of the connection pins 521. The connection pins 521 of the second connection ends 52 of the two handle parts 2 are accommodated in the two openings 224 of the two sliding rails 22. The connection pins 521 of the second connection ends 52 of the two handle parts 2 project beyond the base plates 221 of the two sliding rails 22, the connection pins 521 of the second connection ends 52 of the two handle parts 2 are exposed to the base plates 221 of the two sliding rails 22, and the connection pins 521 of the two second connection ends 52 of the two handle parts 2 are exposed out of the two outer surfaces of the two sliding rails 22. The connection pads 511 of the two first connection ends 51 of the two sliding blocks 12 are exposed out of the two outer surfaces of the two sliding blocks 12.

The connection pins 521 of the two second connection ends 52 of the two handle parts 2 contact with the connection pads 511 of the two first connection ends 51 of the two sliding blocks 12. The connection pins 521 of the two second connection ends 52 of the two handle parts 2 are conductive with the connection pads 511 of the two first connection ends 51 of the two sliding blocks 12, so the main body 1 is electrically connected with the two handle parts 2. The connection pins 521 of the two second connection ends 52 of the two handle parts 2 are correspondingly disposed in the two sliding grooves 225 of the two sliding rails 22 to prevent the connection pins 521 of the two handle parts 2 which are exposed to the base plates 221 of the two sliding rails 22 being collided by an external force to be damaged.

As described above, the game console 100 includes the main body 1, the two handle parts 2 detachably mounted to the main body 1, the two limiting modules 3 disposed to the main body 1, and the two push buttons 4 mounted in the housing 101 of the main body 1. The two push buttons 4 are exposed to a rear surface of the main body 1. The two handle parts 2 are electrically connected with the main body 1, the two push buttons 4 contact with the two limiting modules 3, and the two push buttons 4 press the two limiting modules 3. Furthermore, each handle part 2 has the sliding rail 22, the two upper portions of the two rear covering walls 226 of the two sliding rails 22 are cut off to form the two notches 223, the two middles of the two opposite outer surfaces of the main body I are equipped with the two sliding blocks 12, the two protruding blocks 122 of the two sliding blocks 12 slide in the two sliding rails 22 along the sliding direction of the two sliding blocks 12, each limiting module 3 has the buckling block 314, the two buckling blocks 314 of the two limiting modules 3 are buckled in the two notches 223 of the two sliding rails 22, so that the two sliding blocks 12 are slidably fastened in the two sliding rails 22, and the two sliding blocks 12 are slidably limited in the two sliding rails 22, an assembling stability of the two sliding blocks 12 and the two sliding rails 22 is improved. In addition, when the user exerts the pressing force to press the contact portion 431 of each push button 4, the buckling block 314 is receded from the restricting groove 111 of the rear inner wall of each fixing groove 11 and the one notch 223 of the sliding rail 22 of the one handle part 2 along the pressing direction of the push button 4, the limiting status of the one sliding block 12 and the sliding rail 22 of the one handle part 2 is eliminated, so the one handle part 2 is detached from the main body 1 along the sliding direction of the one handle part 2. As a result, the game console 100 includes the two detachable handle parts 2 and enhances an assembling stability of the game console 100.

What is claimed is:

1. A game console, comprising:

a main body, at least one outer surface of the main body being recessed inward to form at least one fixing groove, an upper portion of a rear inner wall of the at least one fixing groove being recessed rearward to form a restricting groove;

at least one sliding block fixed in the at least one fixing groove, an inside of the at least one sliding block having an accommodating groove recessed inward from an inner surface of the at least one sliding block, and a limiting hole penetrating through a rear of the at least one sliding block;

at least one handle part detachably mounted to at least one side of the main body;

at least one sliding rail disposed to one side surface of the at least one handle part which faces the main body, the at least one sliding rail being matched with the at least one sliding block, and the at least one sliding block being slidably assembled with the at least one sliding rail, an outer surface of an upper portion of a rear of the at least one sliding rail being recessed inward and opposite to the main body to form a notch, the limiting hole being corresponding to the notch;

at least one limiting structure movably assembled to an inner surface of the at least one sliding block, the at least one limiting structure having a buckling block, the buckling block being limited in the limiting hole, the buckling block projecting beyond the rear of the at least one sliding block, the buckling block being restricted in the restricting groove;

at least one elastic element elastically abutting between the at least one limiting structure and a front inner wall of the accommodating groove of the at least one sliding block; and at least one push button mounted to a rear of the main body, the at least one push button keeping abutting against the at least one limiting structure;

wherein each sliding rail of the at least one sliding rail has a base plate, a front and a rear of the base plate protrude perpendicular to the base plate and towards the main body to form two lateral walls, two tail ends of the two lateral walls protrude towards each other to form the two covering walls, a middle of an outer surface of the each sliding rail is recessed inward and longitudinally extends oppositely to form a sliding groove, the two covering walls are perpendicular to the two lateral walls, the base plate, the two lateral walls and the two covering walls of the each sliding rail together surround the sliding groove;

wherein when the at least one sliding block fully slides into the at least one sliding rail, the at least one elastic element is located at an original status, the buckling block is buckled in the notch to prevent the at least one handle part breaking away from the main body; and wherein when the at least one push button is pressed, the at least one push button keeps pressing against the at least one limiting structure, and the at least one limiting structure compresses the at least one elastic element along a pressing direction of the at least one push button, the buckling block is receded from the notch along the pressing direction of the at least one push button, the at least one handle part is detached from the main body along a sliding direction of the at least one handle part.

2. The game console as claimed in claim 1, wherein the game console includes two sliding rails, and two handle parts detachably mounted to two opposite sides of the main body, one side surface of each handle part facing towards the main body is recessed inward and opposite to the main body to form a locating groove, the two sliding rails are located in the two locating grooves of the two handle parts.

3. The game console as claimed in claim 2, wherein two upper portions of the two rear covering walls of the two sliding rails are cut off to form two notches, the notch of one sliding rail is communicated with the sliding groove of the one sliding rail, the notch of the other sliding rail is communicated with the sliding groove of the other sliding rail.

4. The game console as claimed in claim 2, wherein two middles of two opposite outer surfaces of the main body are equipped with two sliding blocks, each sliding block has a base portion, and a protruding block extended outward from an outer periphery of the base portion, when the two handle parts are assembled to the main body, the two protruding blocks of the two sliding blocks slide into the two sliding grooves of the two sliding rails, the two protruding blocks of the two sliding blocks are slidably received in the two sliding grooves of the two sliding rails along a sliding direction of the two sliding blocks, the base plate, the two lateral walls and the two covering walls of each sliding rail enclose the protruding block of one sliding block.

5. The game console as claimed in claim 4, wherein each sliding block is equipped with a first connection end, the sliding rail of each handle part is equipped with a second connection end, the first connection end has a connection pad, the second connection end has a connection pin, the base plate defines an opening penetrating through the base plate along a transverse direction, the connection pins of the second connection ends of the two handle parts are accommodated in the two openings of the two sliding rails, the connection pads of the two first connection ends of the two sliding blocks are exposed out of two outer surfaces of the two sliding blocks, the connection pins of the two second connection ends of the two handle parts contact with the connection pads of the two first connection ends of the two sliding blocks, the connection pins of the two second connection ends of the two handle parts are conductive with the connection pads of the two first connection ends of the two sliding blocks, the connection pins of the two second connection ends of the two handle parts are correspondingly disposed in the two sliding grooves.

6. The game console as claimed in claim 4, wherein an inside of each sliding block has the accommodating groove and the limiting hole, an upper portion of an inner surface of the base portion is recessed inward to form the accommodating groove, an outside of a rear of the accommodating groove extends rearward to form the limiting hole, the accommodating groove is perpendicularly communicated with the limiting hole, the main body has a hollow housing, the accommodating groove is connected to an inside of the housing.

7. The game console as claimed in claim 6, wherein the game console has two limiting modules mounted to the two sliding blocks, each limiting module includes a limiting structure and an elastic element, the limiting structure has a base board, a lower portion of one end of the base board perpendicularly protrudes rearward to form the buckling block, the other end of the base board protrudes frontward to form a protruding pillar, the elastic element is mounted around the protruding pillar, and the protruding pillar and the elastic element are both positioned in the accommodating groove, the elastic element elastically abuts between the protruding pillar and the front inner wall of the accommodating groove of the one sliding block.

8. The game console as claimed in claim 7, wherein the elastic element is a compression spring.

9. The game console as claimed in claim 7, wherein a bottom of the base board extends downward to form a fixing ring, an upper portion of the one end of the base board of each limiting module perpendicularly protrudes rearward and towards one push button to form a pressing pillar, two middles of two outer surfaces of the main body are recessed inward to form two fixing grooves, the two sliding blocks are fixed in the two fixing grooves, an upper portion of a rear inner wall of each fixing groove is recessed rearward to form the restricting groove, an inner surface of the base portion of each sliding block protrudes inward and towards the main body to form a hollow fixing pillar, the fixing pillar is inserted into the fixing ring.

10. The game console as claimed in claim 9, wherein two upper portions of two sides of a rear of the housing define two button holes longitudinally penetrating through the rear of the housing, the game console has two push buttons, the two push buttons are mounted in the two button holes, each push button has a fastening end positioned at an inner surface of the rear of the housing, a flexible arm extended upward from a middle of a top of the fastening end, and a movable end extended upward and transversely expanded from a free end of the flexible arm, the movable end has a contact portion and an abutting portion, the abutting portion is extended upward and transversely expanded oppositely from the free end of the flexible arm, the contact portion is protruded rearward from a middle of a rear surface of the abutting portion, the two contact portions of the two push buttons are assembled in the two button holes, two rear surfaces of the two abutting portions of the two push buttons abut against the inner surface of the rear of the housing, the two abutting portions of the two push buttons are positioned corresponding to the two button holes, the two pressing pillars of the two limiting modules keep contacting with two front surfaces of the two abutting portions of the two push buttons.

11. A game console, comprising:

a main body, two middles of two outer surfaces of the main body being recessed inward to form two fixing grooves, an upper portion of a rear inner wall of each fixing groove being recessed rearward to form a restricting groove;

two sliding blocks fixed in the two fixing grooves, each sliding block having a base portion, an upper portion of an inner surface of the base portion of each sliding block being recessed inward to form an accommodating groove, an outside of a rear of the accommodating groove extending rearward to form a limiting hole;

two handle parts detachably mounted to two opposite sides of the main body;

two sliding rails disposed to two side surfaces of the two handle parts which face the main body, the two sliding blocks being matched with the two sliding rails, the two sliding rails being slidably assembled with the two sliding blocks, each sliding rail having a base plate, a front and a rear of the base plate protruding perpendicular to the base plate and towards the main body to form two lateral walls, two tail ends of the two lateral walls protruding towards each other to form two covering walls, two upper portions of the two rear covering walls of the two sliding rails being cut off to form two notches, the two limiting holes of the two sliding blocks being disposed corresponding to the two notches of the two sliding rails;

two limiting modules mounted to the two sliding blocks, each limiting module having:

a limiting structure, two limiting structures of the two limiting modules being assembled to two inner surfaces of the two base portions of the two sliding blocks, the limiting structure having a buckling block, the buckling block being limited in the limiting hole, the two buckling blocks of the two limiting structures projecting beyond two rear surfaces of the two sliding blocks, the two buckling blocks of the two limiting structures being restricted in the two restricting grooves of the main body; and an elastic element elastically abutting between the limiting structure and a front inner wall of the accommodating groove of one sliding block; and two push buttons mounted in the main body, the two push buttons being exposed to a rear surface of the main body, the two push buttons keeping abutting against the two limiting structures of the two limiting modules;

wherein a middle of an outer surface of each sliding rail of the two sliding rails is recessed inward and longitudinally extends oppositely to form a sliding groove, the two covering walls are perpendicular to the two lateral walls, the base plate, the two lateral walls and the two covering walls of the each sliding rail together surround the sliding groove, the notch of one sliding rail of the two sliding rails is communicated with the sliding groove of the one sliding rail, the notch of the other sliding rail of the two sliding rails is communicated with the sliding groove of the other sliding rail;

wherein when the two sliding blocks fully slide into the two sliding rails, the two elastic elements of the two limiting modules are located at original statuses, the two buckling blocks are buckled in the two notches of the two sliding rails to prevent the two handle parts breaking away from the main body; and wherein when each push button is pressed, the push button keeps pressing against the limiting structure of one limiting module, and the limiting structure compresses the elastic element along a pressing direction of the push button, the buckling block is receded from one notch of the sliding rail of one handle part along the pressing direction of the push button, the one handle part is detached from the main body along a sliding direction of the one handle part.

12. The game console as claimed in claim 11, wherein one side surface of each handle part facing towards the main body is recessed inward and opposite to the main body to form a locating groove, the two sliding rails are located in the two locating grooves of the two handle parts.

13. The game console as claimed in claim 12, wherein each sliding block has a protruding block extended outward from an outer periphery of the base portion, when the two handle parts are assembled to the main body, the two protruding blocks of the two sliding blocks slide into the two sliding grooves of the two sliding rails, the two protruding blocks of the two sliding blocks are slidably received in the two sliding grooves of the two sliding rails along a sliding direction of the two sliding blocks, the base plate, the two lateral walls and the two covering walls of each sliding rail enclose the protruding block.

14. The game console as claimed in claim 11, wherein each sliding block is equipped with a first connection end, the sliding rail of each handle part is equipped with a second connection end, the first connection end has a connection pad, the second connection end has a connection pin, the base plate defines an opening penetrating through the base plate along a transverse direction, the connection pins of the second connection ends of the two handle parts are accommodated in the two openings of the two sliding rails, the connection pads of the two first connection ends of the two sliding blocks are exposed out of two outer surfaces of the two sliding blocks, the connection pins of the two second connection ends of the two handle parts contact with the connection pads of the two first connection ends of the two sliding blocks, the connection pins of the two second connection ends of the two handle parts are conductive with the connection pads of the two first connection ends of the two sliding blocks, the connection pins of the two second connection ends of the two handle parts are correspondingly disposed in the two sliding grooves of the two sliding rails.

15. The game console as claimed in claim 11, wherein the limiting structure has a base board, a lower portion of one end of the base board perpendicularly protrudes rearward to form the buckling block, the other end of the base board protrudes frontward to form a protruding pillar, the elastic element is mounted around the protruding pillar, and the protruding pillar and the elastic element are both positioned in the accommodating groove, the elastic element elastically abuts between the protruding pillar and the front inner wall of the accommodating groove.

16. The game console as claimed in claim 15, wherein a bottom of the base board extends downward to form a fixing ring, an upper portion of the one end of the base board of each limiting module perpendicularly protrudes rearward and towards one push button to form a pressing pillar, an inner surface of the base portion of each sliding block protrudes inward and towards the main body to form a hollow fixing pillar, the fixing ring is mounted to the inner surface of the base portion which is away from the protruding block, the fixing pillar is inserted into the fixing ring.

17. The game console as claimed in claim 16, wherein the main body has a hollow housing, the accommodating groove is perpendicularly communicated with the limiting hole, the accommodating groove is connected to an inside of the housing, two upper portions of two sides of a rear of the housing define two button holes penetrating through the rear of the housing, the two push buttons are mounted in the two button holes, each push button has a fastening end positioned at an inner surface of the rear of the housing, a flexible arm extended upward from a middle of a top of the fastening end, and a movable end extended upward and transversely expanded from a free end of the flexible arm, the movable end has a contact portion and an abutting portion, the abutting portion is extended upward and transversely expanded oppositely from the free end of the flexible arm, the contact portion is protruded rearward from a middle of a rear surface of the abutting portion, the two contact portions of the two push buttons are assembled in the two button holes, two rear surfaces of the two abutting portions of the two push buttons abut against the inner surface of the rear of the housing, the two abutting portions of the two push buttons are positioned corresponding to the two button holes, the two pressing pillars of the two limiting modules keep contacting with two front surfaces of the two abutting portions of the two push buttons.

* * * * *